United States Patent Office 2,739,174
Patented Mar. 20, 1956

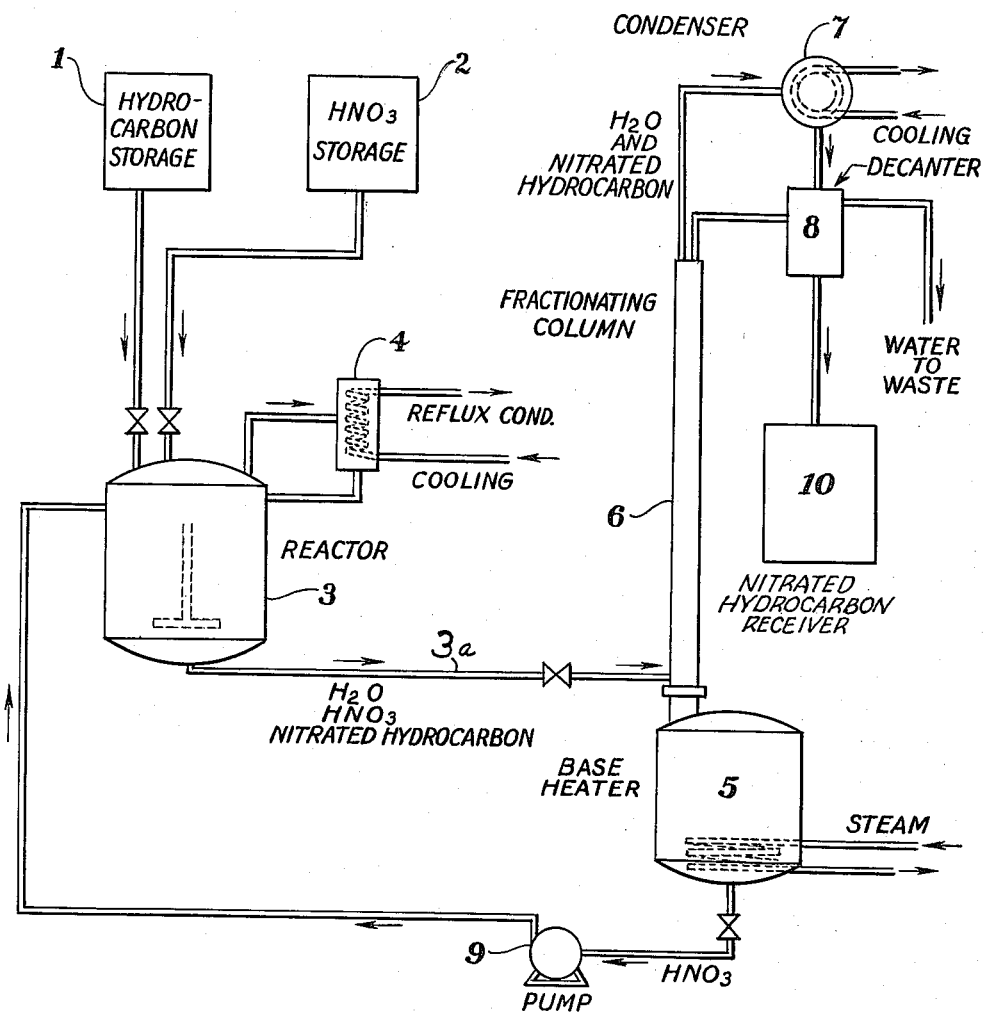

2,739,174

NITRATING AROMATIC HYDROCARBONS WITH ONLY NITRIC ACID

Donald V. Ross, Kingsport, Tenn., assignor to Eastman Kodak Company, Rochester, N. Y., a corporation of New Jersey Application September 8, 1951, Serial No. 245,736

5 Claims. (Cl. 260—645)

This invention relates to a method and apparatus for the nitrating of aromatic organic compounds, and more particularly to the manufacture of nitrated aromatic compounds of the type which are insoluble in and capable of forming azeotropes with water. The process is particularly adapted for continuous production of the desired compounds, but may be used as a batch process if desired.

The nitration of aromatic compounds is perhaps the oldest and best established unit process in the history of the organic chemical industry. Aromatic nitrocompounds are used as intermediates in the dyestuff industry. These compounds also are of importance in the field of explosives.

When nitric acid is reacted with a nitratable compound, the products of reaction are the nitrocompound and water. Unless water is removed from the zone of reaction, the nitration soon stops.

The method ordinarily used in industry to remove water from the zone of reaction consists of the inclusion of concentrated sulfuric acid in the reaction mixture. As is commonly known, sulfuric acid possesses an affinity for water. That is, at high concentrations, it effectively removes water from its environment. In the art, a mixture of nitric and sulfuric acids known as "mixed acid" or "nitration acid" is used for the purpose of nitrating and simultaneously removing the water of reaction.

In the manufacture of mononitro aromatic hydrocarbons the mixed acid is generally not over ⅓ nitric acid, the remainder being concentrated sulfuric acid. As the degree of nitration desired increases, say to a dinitro- or trinitrocompound, the fraction of nitric acid employed is as low as 1/30, the high ratio of sulfuric acid being necessitated by the larger amounts of reaction water formed.

In practice, the mixed acid and the hydrocarbon are charged into a reactor with agitation, the water of reaction being removed by the sulfuric acid and the heat of reaction removed by cooling coils. An emergency tank of water is often installed under the reactor in case the exothermic nature of the reaction causes it to go out of control.

As ancient and widely used as the use of sulfuric and nitric acid mixtures is in the art, their use has many economic disadvantages. For example, the concentration of spent acid is costly because it is extremely corrosive and necessitates frequent repair and replacement of concentrating equipment.

Another undesirable feature of the established process is that the nitrated hydrocarbon, after reaction, contains a proportion of the mixed acids, which must be removed by washing. In washing, however, a considerable percentage of nitrocompound is lost, as is part of the acid, which is discarded with the wash water.

The washed product is generally subjected to a second washing with sodium carbonate to remove traces of acid, and this alkaline wash is followed by a third water wash to remove any alkali. Further purification is necessary, however, and in the case of commercial oil of mirbane, the crude product is steam distilled. As is apparent, this process has many costly and wasteful steps, which, if eliminated, would result in lower manufacturing costs of nitrocompounds such as nitrobenzene. Many investigators and workers in the art have been aware of this, and much work has been done in an effort to simplify and improve the established methods of nitration.

These well-known procedures obviously suffer from several disadvantages, chief among which are; the need for heavy and therefore expensive equipment, the use of a batch in contrast to a continuous process, the slowness of the reaction, necessitating the use of a large unit for a given output, the necessity for recovering sulfuric acid from the spent acid if the process is to be economical, the extremely corrosive nature of the spent acid, and the losses of product and acid accompanying the decanting and washing of the crude product.

It is an important object of my invention to provide a method of manufacturing nitrated aromatic hydrocarbons of high purity with the elimination of the numerous purification steps which were necessary in the prior practices.

Another object of the invention is the provision of a method of manufacturing nitrated aromatic hydrocarbons of the type which are immiscible with and capable of forming azetropes with water, wherein the nitration process is carried out by the use of nitric acid alone and the hydrocarbon which is to be nitrated. Included in this object of the invention are the steps of reacting the hydrocarbon and nitric acid in liquid form, the nitric acid being present in the reaction zone in a quantity substantially in excess of that required for reaction with the hydrocarbon, and withdrawing a liquid mixture of water, nitric acid and nitrated hydrocarbon from the reactor to a fractional distillation apparatus for separating the water-nitrated hydrocarbon azetrope from the nitric acid.

Another object of the invention is the provision of a process for the preparation of nitrated hydrocarbons of high purity continuously, although the process can also be used as a batch process.

A further object of the invention is the provision of a process as referred to above, and particularly applicable to the manufacture of nitrated benzene, toluene, xylene and the like.

Still another object is the provision of apparatus for carrying out the continuous nitration process referred to above.

These and other objects of the invention will be apparent from a study of the following specification when taken in conjunction with the accompanying drawing, in which the figure is a schematic diagram showing the carrying out of the process which is the subject matter of the present invention.

Turning now to the drawing in detail, it will be seen that separate hydrocarbon and nitric acid storage tanks 1 and 2, respectively, are connected to a reactor 3, which is provided with a reflux condenser 4 into which pass vapors from the reactor, and which accomplishes removal of the heat of reaction.

A line 3a passes from below the surface of the liquid mixture in the reactor to a fractionating column 6 and a steam heated base heater 5 for the column. The upper end of fractionating column 6 is connected to a condenser 7, and a decanter 8 is provided for receiving the condensate from the condenser. From the decanter, the nitrated hydrocarbon passes to the storage facilities 10, while the water separated from the nitrated hydrocarbon goes partly to waste and partly to the column as reflux.

The nitric acid separated in the fractionating apparatus collects in the base heater 5, and is recycled to the reactor, as by a pump 9.

I have found that high purity nitrated aromatic hydrocarbons of the type which are immiscible with and capable of forming azeotropes with water may be manufactured by introducing nitric acid alone into a reactor with the hydrocarbon to be nitrated, maintaining the reaction mixture at a temperature sufficiently high that all of the hydrocarbon present as liquid in the reactor is nitrated, withdrawing liquid reaction mixture from the reactor, and distilling the withdrawn liquid to separate the water-nitrated hydrocarbon azeotrope from the nitric acid in the liquid, the azeotrope then being condensed and the water and nitrated hydrocarbon separated, as by decanting.

Working examples illustrating the operation of my invention in practice now follow:

*Example 1*

In this example benzene was nitrated by the continuous and uniform introduction of nitric acid and benzene into a reactor, and with the continuous withdrawal from the apparatus of water and nitrobenzene of high purity over a period of 74 hours. The process is begun with 1000 g. of 70% nitric acid in the reactor and the like amount in the base heater. 1205 grams of benzene were introduced into the nitrator at the rate of 16.3 grams (0.208 mole) per hour, and 727 grams of nitric acid (100% bases) were simultaneously introduced into the nitrator at the rate of 12.9 grams (0.204 mole) per hour. The temperature of the nitrator was maintained at 110–120° C. by the removal of heat from the reflux condenser.

The reaction mixture was continuously withdrawn from below the surface of the liquid in the nitrator and introduced to the base heater. Constant boiling nitric acid vapor was conducted back to the nitrator through a vapor line. In this example the nitric acid was returned in the vapor phase because such procedure was simpler in a laboratory method than the use of a recycling pump 9 as shown in the figure, but in practice, a pump would be used, since the transfer of nitric acid in the vapor phase would waste some of the heat introduced to the base heater, and would overload the reflux condenser 4.

The temperature of the mixture in the base heater was 120° C. The heat was introduced to the base heater to produce continuous vaporization of the mixture up through the fractionating column. The fractionating column was 6 feet long and one inch in diameter, and the inside of the column was packed with ¼ inch glass rings. Temperatures measured at the bottom of the column were 114–119° C., indicating the presence of nearly pure and constant boiling nitric acid. The temperature at the top of the fractionating column was 98–99° C., indicating the presence of the water-nitrobenzene azeotropic mixture.

During the course of this run, 1766 grams of nitrobenzene were withdrawn at the rate of 21.2 grams per hour, and 672 grams of water were withdrawn at the rate of 9.08 grams per hour. The nitrobenzene withdrawn was of excellent purity, and contained no nitric acid, benzene or dinitrobenzene. Its refractive index at 20° C. was 1.5521 and its density at 20° C. was 1.205. The water removed contained no benzene or nitric acid.

*Example 2*

This example is carried out in substantially the same manner as Example 1, 92 grams of toluene being introduced into the nitrator at the rate of 46 grams (0.5 mole) per hour, and simultaneously 63 grams of nitric acid were introduced into the nitrator at the rate of 31.5 grams (0.5 mole) per hour. A temperature of 100–105° C. was maintained in the nitrator.

The temperature of the mixture in the base heater was 120° C., and the temperature measured at the bottom of the column was 114–119°. The temperature at the top of the column was 99°.

In this example 118.7 grams of nitrotoluene were withdrawn at the rate of 59.3 grams per hour and 24.3 grams of water were removed at the rate of 12.1 grams per hour. The resulting nitrotoluene contained no nitric acid or toluene. Its boiling range was 218–231.5° C.

*Example 3*

This example is carried out in substantially the same manner as Example 1, 106 grams of xylene being introduced into the nitrator at the rate of 53 grams (0.5 mole) per hour, and simultaneously 63 grams of nitric acid were introduced into the nitrator at the rate of 31.5 grams (0.5 mole) per hour. A temperature of 99–104° C. was maintained in the nitrator.

The temperature of the mixture in the base heater was 120° C., and the temperature at the bottom of the column was 114–119° C. The temperature at the top of the column was 98° C.

In this example 118 grams of nitroxylene were withdrawn at the rate of 59 grams per hour and 35 grams of water were removed at the rate of 17.5 grams per hour. The resulting nitroxylene contained no nitric acid or xylene. Its density at 20° C. was 1.144.

In carrying out the invention, the fractionating system may be operated under reduced pressures as low as 25 inches of mercury vacuum or lower.

In the nitrating of benzene and the like according to the process shown and described, it is important that the reaction mixture be withdrawn from below the surface of the liquid in the reactor 3 for passage to the fractionating column 6. In nitrating benzene, the vapor above the liquid surface contains benzene, and contamination of the withdrawn mixture with benzene is avoided by withdrawal of the mixture as liquid. It is also important to maintain the temperature in the reactor sufficiently high to assure that the hydrocarbon to be nitrated can exist in the liquid phase in the presence of nitric acid only in the nitrated form. In the case of benzene the temperature should be at least 100° C. in the reactor, or else the reaction mixture passing to the fractionating column will contain benzene, resulting in a benzene contaminated product. At temperatures exceeding 100° C. the nitric acid in the reactor is such a powerful nitrating agent that benzene as such cannot exist in the liquid phase. It is either nitrated to form nitrobenzene or flashed off to the reflux condenser. The reaction mixture withdrawn from the reactor and passed to the fractionating apparatus contains nitric acid ranging from 60–68 percent in concentration, nitrobenzene and water. Since the nitrobenzene and water form an azeotrope which is the more volatile component, this azeotrope is withdrawn at the top of the column, while the constant-boiling nitric acid (68% $HNO_3$) collects in the base heater 5 from which it is continuously withdrawn and returned to the reactor 3.

The above considerations have been set forth particularly with reference to the nitration of benzene, but they are also applicable to the nitration of toluene, xylene, and other aromatic hydrocarbons which are immiscible with and capable of forming azeotropes with water.

It is obvious that I have provided a manufacturing method having a number of advantages, including the use of a continuous process employing relatively small units with a high output, the maintaining of benzene or other hydrocarbons in the reaction vessel at a low concentration, thus minimizing the difficulties associated with the exothermic reaction of the mixture, the elimination of the use of sulfuric acid as used in present commercial processes, the elimination of wasteful washing operations, increased simplicity in controlling the process by ordinary instruments, reduction in the labor cost to a minimum and the production of a product of very high purity without further treatment.

It is to be understood that my process and apparatus may be modified in various minor ways without departing from the inventive concept, and it is my intention to cover by my patent all such variations which fall within the scope of the invention as defined by the appended claims.

I claim:

1. A process for the manufacture of nitrated aromatic hydrocarbons selected from the group consisting of nitrobenzene, nitrotoluene and nitroxylene, comprising contacting the hydrocarbon to be nitrated and a substantial excess of nitric acid in a reaction zone maintained at about 100–120° C. and below the boiling point of the nitrated hydrocarbon, withdrawing liquid mixture free of said hydrocarbon and consisting of water, nitric acid and nitrated hydrocarbon from below the surface of the liquid in the reaction zone, and distilling the liquid thus withdrawn in a distillation zone distinct from said reaction zone and from which there is removed overhead a water-nitrated hydrocarbon azeotrope which provides nitrated hydrocarbon of high purity by a simple condensation and decanting step.

2. A process according to claim 1, wherein the reaction zone contains initially a substantial quantity of nitric acid to which the hydrocarbon and additional nitric acid are fed in equimolar quantities.

3. A process according to claim 2, wherein the hydrocarbon is benzene, the temperature in the reaction zone is maintained at 110–120° C., and the distillation is carried out at a base temperature of 120° C.

4. A process according to claim 2, wherein the hydrocarbon is toluene, and the distillation is carried out at a base temperature of 120° C.

5. A process according to claim 2, wherein the hydrocarbon is xylene, and the distillation is carried out at a base temperature of 120° C.

References Cited in the file of this patent

UNITED STATES PATENTS

| | | |
|---|---|---|
| 414,936 | Burcey | Nov. 12, 1889 |
| 2,260,111 | Caldwell | Oct. 21, 1941 |
| 2,431,585 | Rout | Nov. 25, 1947 |
| 2,475,095 | Hoek | July 5, 1949 |

OTHER REFERENCES

Ind. and Eng. Chem., vol. 34, No. 3 (Mar. 1942), pgs. 286, 291 (Othmer, Jacobs and Levy).

Ind. and Eng. Chem., vol. 36, No. 5 (May 1944), pgs. 447–451 (Othmer and Kleinhans).